(Model.)

D. L. BAUGHMAN.
TUBE CUTTER

No. 334,928. Patented Jan. 26, 1886.

WITNESSES:
Theo. G. Hoster
C. Sedgwick

INVENTOR:
D. L. Baughman
BY Munn & Co
ATTORNEYS.

UNITED STATES PATENT OFFICE.

DELMER L. BAUGHMAN, OF ALBION, INDIANA.

TUBE-CUTTER.

SPECIFICATION forming part of Letters Patent No. 334,928, dated January 26, 1886.

Application filed May 11, 1885. Serial No. 165,079. (Model.)

*To all whom it may concern:*

Be it known that I, DELMER L. BAUGHMAN, of Albion, county of Noble, Indiana, have invented a new and Improved Tube-Cutter, of which the following is a full, clear, and exact description.

The object of my invention is to provide a new and improved device for cutting off old boiler-tubes in boilers or cutting and finishing off the ends of new tubes after the same have been expanded at one end.

The invention consists in the combination, with a tubular stock, of a screw-mandrel having a tapered part, and of blocks in the stock resting on the tapered part of the mandrel and carrying-cutters.

The invention also consists in parts and details and combination of the same, as will be fully set forth hereinafter.

Reference is to be had to the accompanying drawings, forming part of this specification, in which similar letters of reference indicate corresponding parts in all the figures.

Figure 1:
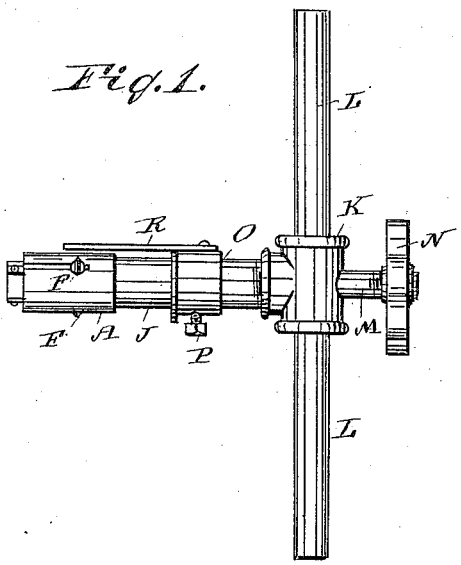
Figure 2:
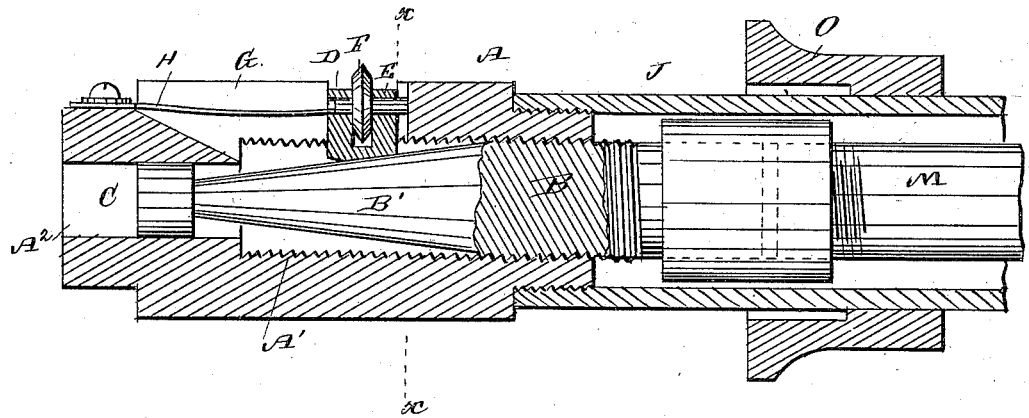
Figure 3:
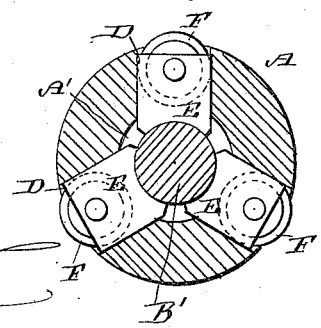

Figure 1 is a plan view of my improved tube-cutter. Fig. 2 is an enlarged longitudinal sectional elevation of the same. Fig. 3 is a cross-sectional view on the line $x$ $x$, Fig. 2.

The tubular stock A is provided with the screw-threaded bore A', and at the end with the smaller smooth bore A². A screw-threaded mandrel, B, is screwed in the bore A', and has a tapered end, B', on the end of which a guide-head, C, is formed, which works in the smooth bore A². The stock has one or more radial slots, D, each containing a box, E, which slides radially, the inner ends of the boxes being grooved or recessed to fit on the tapered part B' of the mandrel. In each box E a cutter-disk, F, is pivoted, the pivots being parallel with the stock. From the slots D slots G extend to near the rear end of the stock, and in the same flat springs H are secured, which press the boxes E upon the tapered part B' of the mandrel. The stock A is screwed in one end of a tube, J, which is provided at the outer end with a T-coupling, K, in which two tube-sections, L, are screwed to serve as handles. A tube or rod, M, is passed through the tube J, and is provided on its outer end with a hand-wheel, N, for turning it. A collar, O, is loosely mounted on the tube J, and can be locked in any desired place by means of a binding-screw, P. A pointer, R, is held on the collar, and serves as a gage for cutting the tubes the desired distance from the tube-sheet or end of boiler.

The operation is as follows: The implement is passed into the tube to be cut until the end of the pointer R strikes the end plate in which the tubes are held, the pointer and its collar having been previously adjusted. Then the hand-wheel Q is turned for the purpose of turning the mandrel and moving it to the inner end of the stocks. The tapered part B' of the mandrel acting on the boxes E, moves them outward and brings the edges of the cutters F in contact with the inner surface of the tube to be cut. The stock is then turned by means of its handle-tubes L, the mandrel B is screwed inward to move the boxes outward farther, then the stock is turned again, and so on until the tube is cut, when the mandrel is screwed back and the springs H push the boxes E back into the stock. In case it is desired to cut larger tubes than can be cut by the stock A, shown, a collar or sleeve is bored out large enough to easily go on the stock A, with one or more holes drilled into it to exactly correspond with the radial slots in the stock A. It is to fit loosely in the tube of the size it is intended for to prevent the stock from moving from side to side while cutting. There is a hole drilled in the collar for a small screw, so that when the collar is put on the stock the small screw fastens the collar on the stock and prevents it from turning on the same.

Having thus described my invention, I claim as new and desire to secure by Letters Patent—

1. The combination of the stock A, the cutters F, mounted therein, and means, substantially as described, for extending the cutters from the stock, the tube J, secured upon the stock as an extension thereof, the collar O, provided with the set-screw P and fitted for adjustment longitudinally upon the tube J, and the pointer R, secured to the collar O and carried outside of and to some distance from the stock A, substantially as shown and described, whereby a pipe to be cut off may pass over the stock and cutters F, and the pointer may extend over the said pipe to the boiler-head as a gage, as set forth.

2. In a tube-cutter, the combination, with the stock A, having the screw-bore A' and the smooth bore A², of the screw-spindle B, having a tapered part, B', and a head, C, fitting in the bore A², the radially-movable boxes E, carrying cutters F, substantially as herein shown and described.

3. In a tube-cutter, the combination, with the tubular stock A, of the mandrel B, having a tapered part, B', the radially-sliding boxes E, the cutters F, and the springs H, acting on the boxes, substantially as herein shown and described.

DELMER L. BAUGHMAN.

Witnesses:
ALTON L. BAUGHMAN,
L. W. WELKER.